INVENTOR.
WILLIAM E. STONEY

ATTORNEY

United States Patent Office 3,365,715
Patented Jan. 23, 1968

3,365,715
MOVING TARGET TRACKING SYSTEM
William E. Stoney, Whittier, Calif., assignor to North American Rockwell Corporation, a corporation of Delaware
Filed June 13, 1966, Ser. No. 556,940
7 Claims. (Cl. 343—7.4)

ABSTRACT OF THE DISCLOSURE

In a clutter-referenced moving target tracking system, clutter-sampling means for fortifying the clutter-reference at the range of a detected target of interest and avoiding the effects of marginal clutter levels. A clutter sample from the sum channel of a monopulse radar is delayed and the delayed clutter sample combined with the undelayed sum signal to provide a clutter-fortified monopulse sum signal for use by the Doppler processors of the moving target tracking system.

---

Radar angle tracking of moving targets in ground clutter using clutter referenced Doppler processing requires not only the presence of the clutter reference, but also, that the clutter reference be of an amplitude sufficiently greater than that of the target. For conditions where the clutter signals become weaker than the target signals, the target signal becomes the Doppler reference and the angle error signals derived from the Doppler modulation are proportional to the clutter deviation from boresight. Under such latter condition the system tracks the clutter. In conditions where the clutter reference signals are greater, but not sufficiently greater, than the target signals, the Doppler error signals permit the system to track somewhere between the target position and the clutter position. Such marginal clutter levels are referred to herein as twilight clutter zones.

By means of the concept of the subject invention, the above described MTT system tracking errors due to marginal clutter levels of a clutter referenced moving target signal are reduced.

In a preferred embodiment of the subject invention there is provided a pulsed energy type, clutter referenced MTT system, including means for reinforcing the clutter reference in the range bin of a detected target. Such clutter reinforcing means comprises means responsive to a received signal output of said system for providing a signal not exceeding a preselected signal level and delayed relative to the receiver output by an interval corresponding to several pulsewidths of the pulsed energy type system. There is also provided signal combining means for combining the output of the receiver and the delayed signal for providing a signal having an improved clutter reference.

By means of the above described arrangement, an early clutter sample is delayed and combined with a subsequent received signal, representing a range bin of interest in which a moving target is detected. The combination of the delayed early signal and target range bin signal provides fortification of the clutter level of the target range bin signal, as to better provide a clutter-referenced moving target signal, and which tends to avoid attenuation thereof by the system Doppler filters. Also, limiting of the delayed early clutter sample prevents the addition of excessive clutter fortification in a strong clutter environment, whereby the moving target signal might otherwise be obscured, while providing sufficient gain for weak clutter environments. Accordingly, it is an object of the subject invention to provide an improved moving target angle tracking system.

It is another object of the invention to provide clutter fortification of a clutter-referenced moving-target angle-tracking signal.

It is another object of the invention to provide means for reducing twilight clutter zones in a clutter referenced moving target angle-tracking system.

A further object of the invention is to provide limited fortification of the clutter level of a clutter-reference signal so as to avoid obscuring the presence of moving target signals indicative of small targets moving radially of the MTT system relative to the clutter source.

These and other objects of the invention will become apparent from the following description taken together with the accompanying drawings in which.

In the figures, like reference characters refer to like parts.

Figure 1:
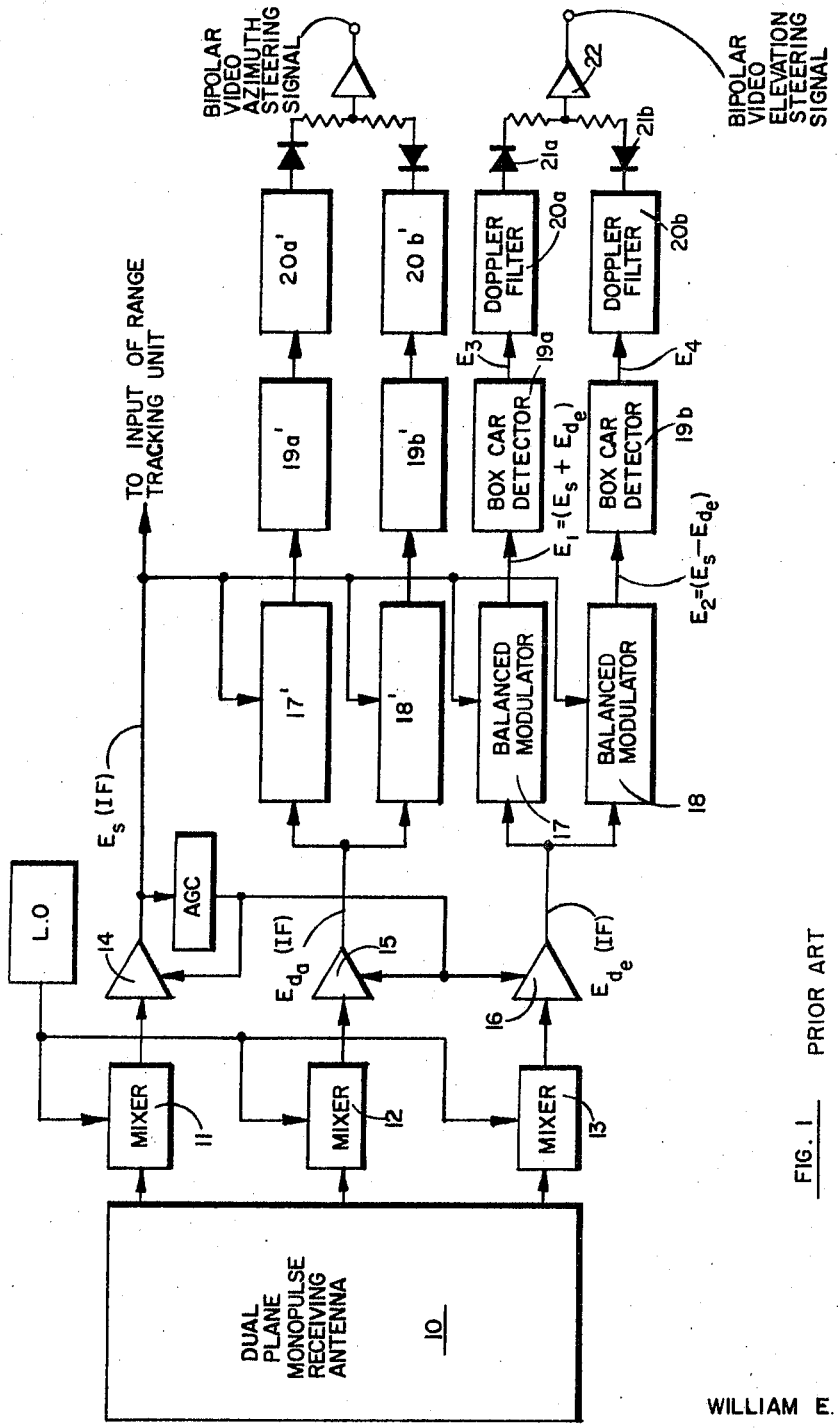
FIG. 1 is a block diagram of a prior art moving target tracking system.

Referring now to FIG. 1, there is illustrated a block diagram of a prior art moving-target tracking system, comprising a dual-plane monopulse receiver. A four horn monopulse antenna (and associated microwave hybrid) 10 and respective mixer stages 11, 12 and 13 form the monopulse sum signal, $E_s$ and the monopulse difference azimuth and elevation signals $E_{de}$ and $E_{da}$ respectively at an intermediate frequency, as is well understood in the art. A range tracking unit (not shown) may gate the receivers at the target range and the I.F. signals containing target and clutter at the gated range can be written as vector sums:

$$\bar{E}_s = \bar{E}_{s_c} + \bar{E}_{s_t}$$

$$\bar{E}_{de} = \bar{E}_{d_{e_c}} + \bar{E}_{d_{e_t}}$$

$$\bar{E}_{d_a} + \bar{E}_{d_{a_c}} + \bar{E}_{d_{a_t}}$$

where $$\bar{E}_{s_c}, E_{d_{e_c}} \text{ and } E_{d_{a_c}}$$

are the respective clutter returns in the sum and difference channels; and $$E_{s_t}, E_{d_{e_t}} \text{ and } E_{d_{a_t}}$$

are the respective target returns in the sum and difference channels. The normalization of the signal strength of the IF monopulse signals for effects of range, target size and reflectivity coefficient, may (if desired) be effected by means of an automatic gain-controlled amplifier 14, 15 and 16 in each receiver channel, each such amplifier having a gain control input commonly responsive to the output of the sum channel amplifier 14, as is well understood in the art.

The signals in each of the monopulse difference channels may be processed to provide steering or tracking error signals. (Such signals may be used either to steer a steerable antenna of a tracking radar, or may be used to steer a vehicle such as a missle in which the radar is installed, so that the radar is always directed toward the target.) Since processing of tracking error signals in the elevation channel is identical to the processing in the azimuth channel, the derivation of only one tracking error signal is described herein. A tracking error or steering signal is derived in the monopulse elevation difference channel by means of dual signalling channels.

The reason that dual (sum and difference) signalling channels are employed in the processing of each of the monopulse difference signals relates to the limitations inherent in clutter-referenced Doppler processing. The conventional Doppler processor employs a unipolarly detected signal which, if clutter-referenced, includes a large unipolar D-C component of a preselected polarity (corresponding to the clutter content) and a smaller A-C signal component the spectral content of which latter component corresponds to the observed Doppler shift of the moving target relative to a clutter source at the same range as the target. A second unipolar detection stage 21, responsively coupled to the output of the Doppler filter 20 provides a unipolar signal indicative of the output of the Doppler filter. Where the input to the Doppler processor is clutter-referenced (e.g., the clutter component of the input is substantially larger than the signal component indicative of the Doppler shift or relative motion between the clutter and a target of interest), then the second-detected unipolar output is indicative of the moving target. Because of the unipolar aspect of the above-described Doppler processing, the necessary phase-sense or polarity aspect of a Doppler-processed monopulse difference signal is ordinarily lost. However, by means of dual processing channels for each monopulse difference channel, in which the monopulse IF difference signal is respectively additively and subtractively combined with the monopulse IF sum channel signal, a bipolar video steering signal may be produced.

Such respective additive and subtractive combination of the IF monopulse difference signal with the monopulse sum signal may be effected by IF balanced modulators 17 and 18, as an exemplary arrangement of which is described and illustrated in U.S. Patent No. 3,238,474 issued Mar. 1, 1966 to A. H. Kazakevicius for Four Port Hybrid Transformer Circuit Providing Accurate Sum and Difference Outputs. Hence, where the I.F. monopulse sum signal level is larger than the associated IF monopulse difference signal levels (as is usually the case), variations in the phase sense of a selected one of the IF monopulse difference signals (corresponding to a change in the sense of the corresponding angular component of the target angle-off-boresight) merely results in a change in the signal level of the combined IF signal, the two (respective additively and subtractively) combined IF signals for a given monopulse difference channel, $E_1$ and $E_2$, varying oppositely in amplitude for a given variation in the associated monopulse IF difference signal, itself. Hence, by comparing the two combined signals (subsequent to separate Doppler processing of each of them), a bipolar angular tracking error, or steering signal, is provided. Such steering signal may be developed by means of an operational differential amplifier responsively coupled to like-detected Doppler-filtered outputs of the pair of Doppler processors for a given monopulse difference channel. Alternatively, the outputs of the pair of Doppler filters 20a and 20b may be oppositely detected (by means of oppositely-poled detectors 21a and 21b) and then additively combined by means of a bipolar video summing amplifier 22, as shown in the arrangement of FIG. 1.

The I.F. adder units 17 and 18 (of FIG. 1) generate the sum ($\overline{E}_1$) and difference ($\overline{E}_2$), respectively, of $\overline{E}_s$ and $\overline{E}_{d_c}$:

$$\overline{E}_1 = \overline{E}_s + \overline{E}_d = \overline{E}_{s_c} + \overline{E}_{d_c} + \overline{E}_{s_t} + \overline{E}_{d_t}$$

$$\overline{E}_2 = \overline{E}_s - \overline{E}_d = \overline{E}_{s_c} - \overline{E}_{d_c} + \overline{E}_{s_t} - \overline{E}_{d_t}$$

The clutter terms are at a frequency proportional to the clutter Doppler shift and the target terms are at a frequency different from the clutter and proportional to the relative motion between the clutter and the target. $\overline{E}_1$ and $\overline{E}_2$ are detected and boxcarred by elements 19a and 19b respectively.

The respective outputs $E_3$ and $E_4$ of sum boxcar 19a and the difference boxcar 19b are low frequency signals with a modulation between zero and one-half the radar pulse repetition frequency (PRF). The amplitude of the modulation varies as follows:

*Case 1*

$[\overline{E}_{s_c} + \overline{E}_{d_c}] > [\overline{E}_{s_t} + \overline{E}_{d_t}]$ the modulation on $E_3$ is $[\overline{E}_{s_t} + \overline{E}_{d_t}]$
$[\overline{E}_{s_c} - \overline{E}_{d_c}] > [\overline{E}_{s_t} - \overline{E}_{d_t}]$ the modulation on $E_4$ is $[\overline{E}_{s_t} - \overline{E}_{d_t}]$

*Case 2*

$[\overline{E}_{s_c} + \overline{E}_{d_c}] < [\overline{E}_{s_t} + \overline{E}_{d_t}]$ the modulation on $E_3$ is $[\overline{E}_{s_c} + \overline{E}_{d_c}]$
$[\overline{E}_{s_c} - \overline{E}_{d_c}] < [\overline{E}_{s_t} - \overline{E}_{d_t}]$ the modulation on $E_4$ is $[\overline{E}_{s_c} - \overline{E}_{d_c}]$

*Case 3*

$[\overline{E}_{s_c} + \overline{E}_{d_c}] > [\overline{E}_{s_t} + \overline{E}_{d_t}]$ the modulation on $E_3$ is $[\overline{E}_{s_t} + \overline{E}_{d_t}]$
$[\overline{E}_{s_c} - \overline{E}_{d_c}] < [\overline{E}_{s_t} - \overline{E}_{d_t}]$ the modulation on $E_4$ is $[\overline{E}_{s_c} - \overline{E}_{d_c}]$

*Case 4*

$[\overline{E}_{s_c} + \overline{E}_{d_c}] < [\overline{E}_{s_t} + \overline{E}_{d_t}]$ the modulation on $E_3$ is $[\overline{E}_{s_c} + \overline{E}_{d_c}]$
$[\overline{E}_{s_c} - \overline{E}_{d_c}] > [\overline{E}_{s_t} - \overline{E}_{d_t}]$ the modulation on $E_4$ is $[E_{s_t} - \overline{E}_{d_t}]$ The Doppler filters 20a and 20b pass only the Doppler modulation, while the output summing amplifier 22 cooperates with second detectors 21a and 21b to detect the modulation amplitude difference and form the following bipolar tracking error signals:

*Case 1.*—Track error=$2E_{d_t}$
*Case 2.*—Track error=$2E_{d_c}$
*Case 3.*—Track error=$E_{s_t} - E_{s_c} + E_{d_t} + E_{d_c}$
*Case 4.*—Track error=$E_{s_c} - E_{s_t} + E_{d_c} + E_{d_t}$ From these conditions, it can be seen that the radar will angle track as follows:

*Case 1.*—Track the target.
*Case 2.*—Track the clutter.
*Case 3.*—Track someplace in between the target and clutter.
*Case 4.*—Track someplace in between the target and clutter.

Case 1 is the usual case because clutter is generally larger than the target; however, Cases 2, 3, and 4 are possible but, of course, undesirable.

Figure 2:
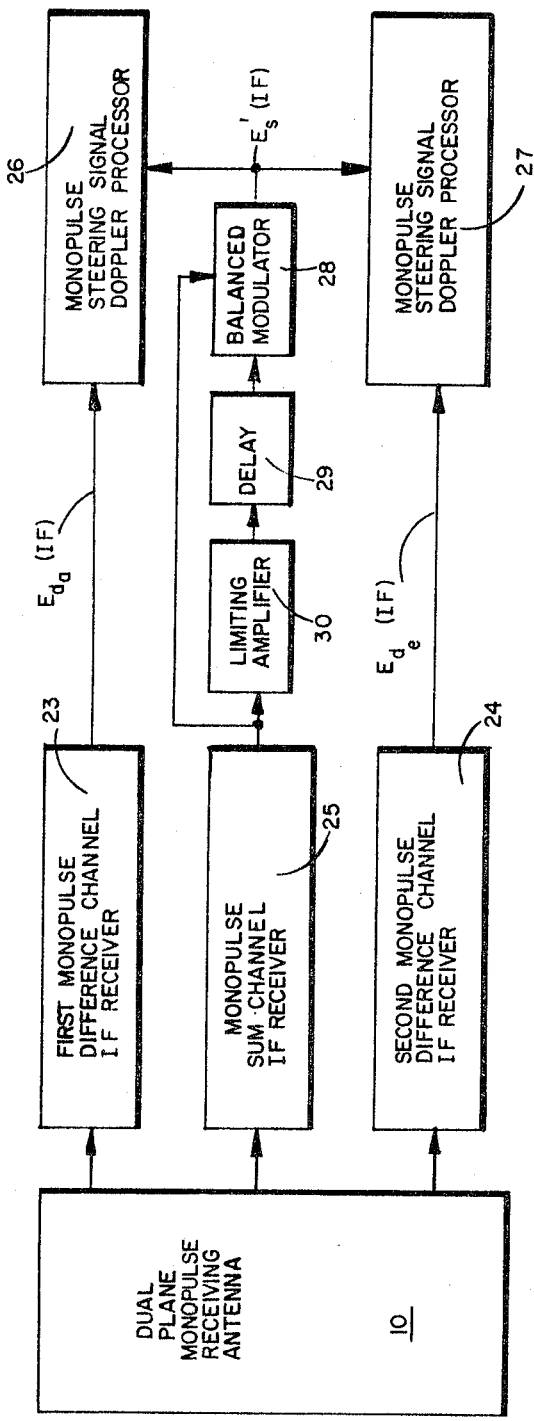
FIG. 2 is a block diagram of a system embodying the concept of the present invention.

By means of the concept of the invention, the situation of Case 1 tends to be simulated within the MIT system, so as to avoid the tracking errors associated with existence of Cases 2, 3 and 4, as shown more particularly in FIG. 2.

Referring now to FIG. 2, there is illustrated in block diagram form a system embodying the concept of the invention. There is provided a dual plane monopulse receiver similar to the arrangement of FIG. 1 in which a first monopulse difference channel IF receiver 23 corresponds to elements 12 and 15 of FIG. 1, second monopulse difference channel IF receiver 24 corresponds to elements 13 and 16 of FIG. 1, and sum channel IF receiver 25 corresponds to elements 11 and 14 of FIG. 1. A first and second steering signal Doppler processor 26 and 27 is responsively connected to the output of IF sum channel receiver 25 and further connected to the IF output of a respective one of first and second monopulse receivers 23 and 24. Doppler processors 26 and 27 are similarly constructed and arranged, and each corresponds to the arrangement of elements 17, 18, 19a, 19b, 20a, 20b, 21a, 21b and 22 of FIG. 1.

There is further provided in the arrangement of FIG. 2, intermediate frequency signal combining means 28 interposed between the IF sum signal inputs to processors 26 and 27 and the output of sum receiver 25. A delay element 29 is responsively coupled to receiver 25 for delaying the output thereof by two or three pulsewidths of the pulsed transmitter (not shown) with which the receiving system of FIG. 2 is intended to cooperate, the delayed signal output of element 29 being fed to a second input of IF summing means 28. In this way, an early clutter sample, provided by delay means 29, is combined with the later target-plus-clutter signal input to IF combining means 28 from receiver 25, so as to reinforce or fortify the clutter content thereof. A limiting amplifier 30 is interposed in series with delay means 29 so as to prevent the addition of excessive early-clutter in the presence of a strong clutter environment, while providing sufficient gain when in a weak clutter environment. In this way, a weak moving-target signal will not be obscured by an excessive clutter signal level. The limit of limiting amplifier 30 may, for example, be selected to correspond to a signal level slightly below that normally provided by the normalized sum channel receiver 25 and employ a gain of, say, one volt per volt.

Hence, by means of the cooperation of elements 28, 29 and 30 of FIG. 2, it is clear that early clutter ($\overline{E}_{EC}$) is added to provide sufficient clutter fortification of the signals processed by Doppler processors 26 and 27 as to correspond to Case 1, described above and repeated here for convenience:

$$[\overline{E}_{EC}+\overline{E}_{sc}+\overline{E}_{dc}] > [\overline{E}_{st}+\overline{E}_{dt}]$$
$$[\overline{E}_{EC}+\overline{E}_{sc}-\overline{E}_{dc}] > [\overline{E}_{st}-\overline{E}_{dt}]$$

and:

Tracking error=$2E_{dt}$ which results in the radar always tracking the target. Accordingly, there has been described an improved moving target angle tracking system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a clutter-referenced moving target tracking system of the pulsed energy type, means for reinforcing the clutter reference in the range bin of a detected target to reduce twilight clutter zones, comprising
    means responsive to a received signal output of said system for providing a signal having a preselected maximum signal level and delayed relative to said received signal output by an interval corresponding to several pulsewidths of said pulsed energy system; and
    signal combining means responsive to said received signal output and said first mentioned means for providing a signal having an improved clutter reference.

2. In a clutter referenced moving target tracking system of the pulsed energy type, means for reinforcing the clutter reference in the range bin of a detected target to reduce twilight clutter zones; comprising:
    a limiting amplifier responsive to a received signal output of the receiver of said system for providing a signal having a preselected maximum signal level; and
    signal combining means having a first and delayed second input coupled to a respective one of said output of said receiver and an output of said amplifier, the second input of said combining means providing a delay corresponding to several pulsewidths of said pulsed energy systems.

3. In a clutter referenced moving target tracking system of the pulsed energy type, means for reinforcing the clutter reference in the range bin of a detected target to reduce twilight clutter zones, comprising
    a limiting amplifier responsive to a received signal output of a receiver of said system for providing a limited signal;
    a delay element coupled to an output of said amplifier for delaying said limited signal by an interval corresponding to several pulsewidths of said pulse energy type systems; and
    means for combining said received signal and said limited and delayed signal to provide an improved clutter reference.

4. The device of claim 3 in which said system is of the monopulse type and in which the limiting amplifier and one input of said means for combining are commonly responsive to a sum channel of said receiver.

5. A clutter referenced moving target tracking system of the pulse energy type including a dual plane monopulse receiver having an intermediate frequency receiver stage providing a first monopulse difference, second monopulse difference and third monopulse sum signal output, means for providing two tracking error signals indicative of mutually orthogonal tracking angle components of the direction of a moving target, comprising
    a first and second steering signal Doppler processor channel responsively coupled to a respective one of the first and second monopulse difference signal channel outputs of said intermediate frequency receiver, each steering signal Doppler processor channel comprising first and second oppositely-poled, video detected, Doppler-filtered signalling channels, input signal combining means interposed at an input of each of said signalling channels and further responsive to the output of said monopulse sum channel of said receiver, and video output signal combining means coupled to said first and second signalling channels for providing a tracking control signal;
    sum signal combining means interposed at said monopulse sum channel output of said receiver; and
    delay means coupled to said monopulse sum channel output of said receiver for providing a signal delayed relative to the output of said receiver by an interval corresponding to several pulsewidths of said pulsed energy type systems, said sum signal combining means being further responsive to said delay means.

6. The device of claim 5 in which there is further provided signal limiting means for limiting the amplitude of said delayed signal to a preselected amplitude.

7. The device of claim 5 in which there is further provided a signal-limiting amplifier in cooperation with said delay means for providing a preselected maximum signal level said delayed signal.

No references cited.

RODNEY D. BENNETT, *Primary Examiner.*

RICHARD A. FARLEY, *Examiner.*

T. H. TUBBESING, *Assistant Examiner.*